3,211,548
PROCESS FOR THE PRODUCTION OF TANTALUM OR NIOBIUM IN A HYDROGEN PLASMA JET

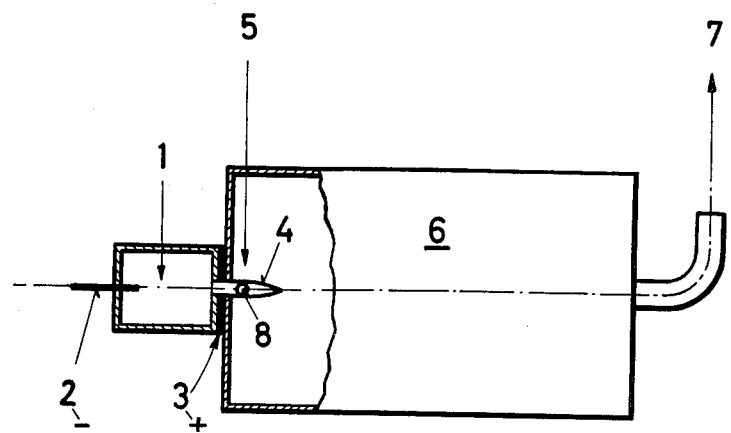

Walter Scheller, Muenchenstein, Claude Beguin, Basel, and Klaus Schuett, Zollikerberg, Switzerland, assignors to Ciba Limited, Basel, Switzerland, a company of Switzerland
Filed Nov. 21, 1962, Ser. No. 239,166
Claims priority, application Switzerland, Nov. 23, 1961, 13,665/61
7 Claims. (Cl. 75—84)

The term "plasma" as used in gas discharge physics describes a partially or completely ionized gas. When the plasma as a whole has a directional velocity, this is referred to as a plasma jet. Such a plasma jet can be produced, for example, by blowing a gas through an electric arc. In this way temperatures of 20,000° C. and higher can be attained. The velocity may range from a few metres per second to a multiple of the speed of sound.

It is known that chemical reactions can be performed in a plasma jet. Using this process, thermal decompositions, halogenations and conversions of metals or metalloids into their nitrides and reductions with carbon have been carried out; cf. inter alia, "The Plasma Jet" in Scientific American 197, 1957, No. 2, pages 80 et seq.

It is also known that the gas plasma may consist of an inert gas or of a reactive gas. When, for example, argon is used the resulting plasma jet serves only as a source of heat; when, on the other hand, nitrogen or oxygen is used the resulting gas not only has a high temperature but it is also capable of undergoing chemical conversions under suitable conditions. When a carbon or graphite anode is used, reactions with carbon can be performed in the plasma jet.

It has now been found that compounds of tantalum or niobium can be reduced in a plasma jet when the plasma jet is produced with the use of hydrogen gas and when the plasma jet contains a finely dispersed, condensed substance, that is to say a substance having so low a vapour pressure that no appreciable vaporisation occurs.

The present invention provides a process for reducing tantalum pentachloride or niobium pentachloride with hydrogen, wherein the chloride or a mixture of the chlorides is injected into a hydrogen plasma and the reaction is performed in the presence of a condensed substance dispersed in the hydrogen jet.

Tantalum or niobium can be produced by the present process in an economical manner. Compared with the processes previously known for reducing these metals, for example the electrolytic or thermite process or the gas phase reduction with hydrogen at a low temperature, or by the fluidised bed process, the present process offers the great advantage that the metals are obtained in a very pure form and that the precipitated metals do not form increasing deposits on the wall of the reduction vessel but are deposited in the form of fine powders or granulates. Moreover, owing to the high temperature and hydrogen throughout per unit time relatively large amounts of chloride are reduced when the reaction is performed as a continuous operation.

The chlorides may be reduced either completely until the element concerned is obtained or taken to a stage at which the element occurs in a lower valency in the compound formed.

The presence of a finely dispersed, condensed, for example solid, substance offers various advantages: The metal formed in the gas plasma jet is enabled to grow at least to some extent on the particles of the finely dispersed substance. When the dispersed substance is tantalum or niobium powder, these particles grow as the same metal deposits progressively on them and the final product is substantially pure tantalum or niobium respectively. When particles of another substance are used, tantalum or niobium form a coating on them.

The presence of the solid substance extends the length of the hot zone in which the reduction and the condensation takes place.

Instead of the pure pentachlorides it is possible to reduce mixtures prepared from the crude minerals.

The condensed substance used in the present process may be injected into the plasma jet as it is, or a substance may be so injected which under the conditions produced by the plasma jet is converted into the condensed, finely dispersed state. The finely dispersed substance is in the form of fine, inconspicuous particles having an average diameter of less than 500 microns. As finely dispersed substances there are suitable oxides, carbides, nitrides or more especially metals or metalloids. Advantageously, the finely dispersed substance can be a heavy metal, a carbide and an oxide of a heavy metal. Suitable oxides are tantalum oxide, uranous oxide, quartz and alumina, as carbides, boron carbide and silicon carbide, as nitride, aluminium nitride and as metals and metalloids respectively: tantalum, niobium, canadium, tungsten, titanium, molybdenum, nickel, iron, uranium, platinum, boron, carbon or silicon. Substances which, like tantalum pentoxide or quartz, can be reduced with hydrogen but are not intended to be reduced, are injected into the plasma jet in a manner such that they do not have sufficient time left to undergo an appreciable reaction with hydrogen. Depending on the conditions used the time of contact between the finely dispersed substance and the plasma jet ranges from $10^{-2}$ to $10^{-4}$ second.

The plasma jet is produced with the use of a powerful electric arc in a so-called plasma generator which is advantageously designed on the known principle and comprises a water-cooled, pierced copper anode and a cooled tungsten cathode.

A diagrammatic layout of a plasma jet generator is shown in side elevation in the figure, in which 1 is the hydrogen inlet (hydrogen is generally injected at right angles to the axis of the plasma jet; the rate of hydrogen supply may be varied within wide limits); 2 is the water-cooled cathode which should advantageously be variable for position; 3 is the cooled anode; 4 represents the plasma jet produced; 5 is the inlet of the finely dispersed substance; 6 is the reactor and 7 the waste gas duct; the chloride to be reduced is injected into the plasma jet at 8.

The chloride of tantalum or niobium respectively is advantageously injected into the plasma jet through an inlet tube of quartz. If desired a current of hydrogen or preferably of argon may be used for transporting the chloride. As a rule, the reduction in the plasma jet is carried out under atmospheric pressure but, if desired, reduced pressure may be used. When the substance constituting the finely dispersed phase is used from the start in the condensed form, for example as a metal powder, it is of advantage to inject it with the aid of a current of argon gas. When, on the other hand, the substance constituting the disperse phase is only converted into the condensed form in situ, it may be added to the plasma jet without using a carrier gas. The points where the chloride and the substance forming the finely dispersed phase are most advantageously injected into the plasma jet should be determined by way of preliminary tests. As a rule, the substance constituting the finely dispersed phase will be injected immediately past the anode and then, at a short distance from that point, the chloride is introduced. According to a preferred manner of performing the present process the chloride, in admixture with the finely dispersed substance, is injected into the plasma jet in the vicinity of the anode outlet. As the distance from the anode increases, the temperature drops. The places at which the finely dispersed substance and the chloride are added should be so chosen as to produce a temperature of 2000 to 5000° C. The amounts of chloride and dispersed substance to be injected into the plasma jet depend on the size, temperature and velocity of the plasma jet and also on the kind and state of the substances supplied. The expert will have no difficulty in establishing the optimum conditions by relevant preliminary tests.

EXAMPLE 1

*Production of tantalum*

The plasma generator was operated under the following conditions:

| | |
|---|---|
| Current | 215 amperes. |
| Voltage of arc | 104 volts. |
| Total output | 22.4 kilowatts. |
| $H_2$ throughput | 74 liters (measured under 760 mm. Hg. pressure at 0° C.) per minute. |

The luminous plasma jet (Balmer lines) had an average velocity of about 1500 meters per second at the anode exit, a length of 2 to 3 cm. and at the anode exit an average temperature of about 3300° C. At a distance of 1 cm. from the anode about 12 g. of tantalum powder (particle size below 42 microns) per minute were injected into the flame with the aid of a current of argon. The tantalum particles formed a luminous jet of 10 to 15 cm. length. At approximately the same distance from the anode a mixture of vaporised tantalum pentachloride and argon was injected through a heated quartz nozzle into the plasma jet. The amount of injected tantalum pentachloride was about 25 g. per minute. On completion of the reaction it was found by sieve analysis that part of the tantalum produced had grown on the injected metal.

EXAMPLE 2

*Growing niobium on tantalum*

A pulverulent mixture of equal parts by weight of niobium pentachloride and of tantalum metal is injected directly past the anode outlet into the plasma jet described in Example 1. The test conditions used are as follows:

| | |
|---|---|
| Current | 180 amperes. |
| Voltage of arc | 94 volts. |
| Total output | 16.9 kilowatts. |
| $H_2$ throughput | 39 liters (measured under 760 mm. Hg. pressure at 0° C.) per minute. |
| Average velocity at anode outlet | 850 meters per second. |
| Average temperature at anode outlet | 3500° C. |
| Time of contact of tantalum particles with plasma jet | $10^{-2}$ to $10^{-3}$ second. |
| Particle size | Below 60 μ. |

When the powder formed was examined it was found that the tantalum particles contain about 2.5% of precipitated niobium.

EXAMPLE 3

*Growing niobium on uranous oxide* ($UO_2$)

The procedure is as described in Example 2, except that the injected mixture consists of uranous oxide and niobium pentachloride in the weight ratio 1:2.

The conditions used are as follows:

| | |
|---|---|
| Current | 220 amperes. |
| Voltage of arc | 107 volts. |
| Total output | 23.5 kilowatts. |
| $H_2$ throughput | 74 liters (measured under 760 mm. Hg. pressure at 0° C.) per minute. |
| Average velocity at anode outlet | 1600 meters per second. |
| Average temperature at anode outlet | 3400° C. |
| Time of contact of uranous oxide particles with plasma jet | Abt. $10^{-3}$ second. |
| Particle size | Below 100 μ. |

When the powder formed was examined it was found that the uranous oxide particles contain about 5% of precipitated niobium.

EXAMPLE 4

*Growing niobium on uranium carbide* ($UC_2$)

The dispersed substance used is uranium carbide and the chloride is niobium pentachloride in the weight ratio of 1:2. The reduction is performed as described in Example 3, and yields uranium carbide particles on which a deposit of about 3% of niobium has formed.

What is claimed is:

1. A process for reducing a metal chloride with hydrogen selected from the group consisting of tantalum pentachloride and niobium pentachloride in which process the chloride is introduced into a hydrogen plasma and the reduction is carried out in the presence of a condensed substance, having a vapor pressure which enables the substance to remain substantially in condensed state at reaction conditions, having a particle size smaller than 500 microns and being dispersed in the hydrogen jet, the contact of the dispersed substance with the hydrogen jet ranges from $10^{-2}$ to $10^{-4}$ second and the reaction temperature is between 2000 and 5000° C.

2. A process for reducing tantalum pentachloride with hydrogen in which process the chloride is introduced into a hydrogen plasma and the reduction is carried out in the presence of a condensed substance, having a vapor pressure which enables the substance to remain substantially in condensed state at reaction conditions, having a particle size smaller than 500 microns and being dispersed in the hydrogen jet, the contact of the dispersed substance with the hydrogen jet ranges from $10^{-2}$ to $10^{-4}$ second and the reaction temperature is between 2000 and 5000° C.

3. A process for reducing a metal chloride with hydrogen selected from the group consisting of tantalum pentachloride and niobium pentachloride in which process the chloride is introduced into a hydrogen plasma and the reduction is carried out in the presence of a condensed substance, having a vapor pressure which enables the substance to remain substantially in condensed state at reaction conditions, having a particle size smaller than 500 microns and being dispersed in the hydrogen jet, which condensed substance is selected from the group consisting of a heavy metal, a carbide and an oxide of a heavy metal, the contact of the dispersed substance with the hydrogen jet ranges from $10^{-2}$ to $10^{-4}$ second and the reaction temperature is between 2000 and 5000° C.

4. A process for reducing tantalum pentachloride with hydrogen in which process the chloride is introduced into a hydrogen plasma and the reduction is carried out in the presence of a condensed substance, having a vapor pressure which enables the substance to remain substantially in condensed state at reaction conditions, having a particle size smaller than 500 microns and being dispersed in the hydrogen jet, which condensed substance is selected from the group consisting of a heavy metal, a carbide and an oxide of a heavy metal, the contact of the dispersed substance with the hydrogen jet ranges from $10^{-2}$ to $10^{-4}$ second and the reaction temperature is between 2000 and 5000° C.

5. A process for reducing tantalum chloride with hydrogen to tantalum metal in which process the chloride is introduced into a hydrogen plasma and the reduction is carried out in the presence of tantalum powder having a particle size smaller than 500 microns and being dispersed in the hydrogen jet, the contact of the dispersed tantalum with the hydrogen jet ranges from $10^{-2}$ to $10^{-4}$ second and the reaction temperature is between 2000 and 5000° C.

6. A process for reducing niobium chloride with hydrogen to niobium metal in which process the chloride is introduced into a hydrogen plasma and the reduction is carried out in the presence of tantalum powder having a particle size smaller than 500 microns and being dispersed in the hydrogen jet, the contact of the dispersed tantalum with the hydrogen jet ranges from $10^{-2}$ to $10^{-4}$ second and the reaction temperature is between 2000 and 5000° C.

7. A process for reducing niobium chloride with hydrogen to niobium metal in which process the chloride is introduced into a hydrogen plasma and the reduction is carried out in the presence of uranous oxide having a particle size smaller than 500 microns and being dispersed in the hydrogen jet, the contact of the dispersed uranous oxide with the hydrogen jet ranges from $10^{-2}$ to $10^{-4}$ second and the reaction temperature is between 2000 and 5000° C.

References Cited by the Examiner
UNITED STATES PATENTS 2,761,776   9/56   Bichowsky _____ 75—84

CARL D. QUARFORTH, *Primary Examiner.*

REUBEN EPSTEIN, *Examiner.*